United States Patent
Pfeifer

(10) Patent No.: US 10,492,639 B1
(45) Date of Patent: Dec. 3, 2019

(54) CONVECTIVE HEATING SYSTEM FOR A PORTABLE BEVERAGE DISPENSING CONTAINER

(71) Applicant: Grindmaster Corporation, Louisville, KY (US)

(72) Inventor: Thomas Joseph Pfeifer, Louisville, KY (US)

(73) Assignee: Grindmaster Corporation, Louisville, KY (US)

( * ) Notice: Subject to any disclaimer, the term of this patent is extended or adjusted under 35 U.S.C. 154(b) by 380 days.

(21) Appl. No.: 15/378,684

(22) Filed: Dec. 14, 2016

Related U.S. Application Data

(60) Provisional application No. 62/267,612, filed on Dec. 15, 2015.

(51) Int. Cl.
  *A47J 31/00* (2006.01)
  *A47J 31/44* (2006.01)
  *A47J 41/00* (2006.01)

(52) U.S. Cl.
  CPC ............. *A47J 31/005* (2013.01); *A47J 31/44* (2013.01); *A47J 31/4403* (2013.01); *A47J 31/4432* (2013.01); *A47J 31/4435* (2013.01); *A47J 41/005* (2013.01); *A47J 41/0044* (2013.01)

(58) Field of Classification Search
  CPC .. A47J 41/005; A47J 41/0044; A47J 31/4432; A47J 31/4435; B05C 5/001; B05C 11/1042; F28D 1/06
  USPC ........................ 99/307, 306, 290, 323.3, 288; 220/592.28, 592.24, 592.16; 222/146.2, 222/146.5
  See application file for complete search history.

(56) References Cited

U.S. PATENT DOCUMENTS

| | | | |
|---|---|---|---|
| 4,457,217 A * | 7/1984 | Ogawa | A47J 31/467 392/451 |
| 4,621,571 A | 11/1986 | Roberts | |
| 5,907,993 A | 6/1999 | Van Camp et al. | |

(Continued)

OTHER PUBLICATIONS

Bunn-O-Matic Corporation, "Installation & Operating Manual" for Soft Heat Server 1.0 & 1.5 Gallon, 2015.
(Continued)

*Primary Examiner* — Reginald Alexander
(74) *Attorney, Agent, or Firm* — Stites & Harbison, PLLC; David W. Nagle, Jr.; James R. Hayne

(57) ABSTRACT

A portable beverage dispensing container comprises a housing and an internal beverage holding tank positioned in and contained within the housing. The internal beverage holding tank is configured to receive and store a beverage, with a dispensing nozzle on an external surface of the housing in fluid communication with the internal beverage holding tank. The housing includes one or more openings defined through a surface thereof, such that heated air can be introduced into the housing and into a space defined between the internal beverage holding tank and the housing. A satellite brewing system includes such a portable beverage dispensing container, along with a brewing station with a heater and a fan for generating heated air. When the portable beverage dispensing container is positioned at the brewing station, the heated air is directed into the space defined between the internal beverage holding tank and the housing of the shuttle.

12 Claims, 7 Drawing Sheets

(56) References Cited

U.S. PATENT DOCUMENTS

| | | | | |
|---|---|---|---|---|
| 6,286,415 B1 * | 9/2001 | Leung | ................... | A47J 31/441 |
| | | | | 220/592.28 |
| 6,722,264 B2 * | 4/2004 | Takatsuki | ............ | A47J 31/4432 |
| | | | | 99/279 |
| 7,886,655 B1 * | 2/2011 | Lassota | ................... | A47J 31/06 |
| | | | | 99/306 |

OTHER PUBLICATIONS

Grindmaster-Cecilware, "Operator Manual" for PB330 and PB430 PrecisionBrew Digital Shuttle Brewers, 2016.
Grindmaster-Cecilware, "Operator Manual" for P200E Shuttle Brewer, 2016.

* cited by examiner

CONVECTIVE HEATING SYSTEM FOR A PORTABLE BEVERAGE DISPENSING CONTAINER

CROSS-REFERENCE TO RELATED APPLICATIONS

The present application claims priority to U.S. Patent Application Ser. No. 62/267,612 filed on Dec. 15, 2015, the entire disclosure of which is incorporated herein by reference.

BACKGROUND OF THE INVENTION

In the food service industry, the prompt availability of high quality hot beverages, predominantly coffee, is a necessity. Since customers may request such hot beverages in sporadic intervals and in varying amounts throughout the day, it has become necessary to have large volumes of fresh beverage available on demand. At the same time, it is desirable to provide beverage dispensing capabilities at a number of locations throughout a restaurant or other location so that servers or other wait staff do not need to return to the brewer to retrieve a fresh beverage.

Thus, manufacturers of coffee brewers have developed satellite (or shuttle) brewing systems. In such systems, the beverage is brewed at a central brewing station, and then transported in separate and portable beverage dispensing containers (commonly referred to as shuttles) to various convenient locations at which the beverage can be dispensed for consumption either by food service personnel or the consumer. For a further discussion of satellite brewing systems, see, for example, U.S. Pat. No. 5,907,993 issued to Van Camp, et al. and U.S. Pat. No. 4,621,571 issued to Roberts.

In some such satellite brewing systems, to maintain the temperature of the beverage, when the shuttle is at the brewing station, a heating element is used to provide direct heat to the shuttle and the beverage contained therein. Specifically, a heating element often is in direct contact with the internal beverage holding tank (or liner) of the shuttle. However, the use of such a heating element, which is often below the shuttle, often results in inconsistent heating of the beverage, which can adversely affect the quality of the beverage.

Thus, there remains a need for an improved means by which to heat and/or to maintain the temperature of the beverage in the portable beverage dispensing container (or shuttle) when it is at the brewing station.

SUMMARY OF THE INVENTION

The present invention is a convective (or forced air) heating system for a portable beverage dispensing container of a satellite brewing system. When the portable beverage dispensing container is positioned at the brewing station to receive a brewed beverage, heated air is directed into a space defined between an internal beverage holding tank and a housing of the portable beverage dispensing container.

An exemplary satellite brewing system made in accordance with the present invention generally comprises a brewing station and a portable beverage dispensing container (or shuttle). The shuttle is selectively positioned under a brew basket of the brewing station. The brewing station includes a water tank (or reservoir) with a heater configured to heat and maintain the water at a predetermined temperature. In use, a plumbing system of the brewing station delivers the hot water from the water tank to a spray head. The spray head then delivers the hot water to the brew basket, introducing the hot water into the brew basket, such that the hot water contacts and passes through a quantity of ground coffee, tea, or other beverage component to produce a brewed beverage, which moves downward under the force of gravity and through a filter, pod, or other media (not shown) before being dispensed into the shuttle.

The shuttle includes a housing with an internal beverage holding tank (or liner) positioned in and contained within the housing. A convective (or forced air) heating system supplies heated air to the shuttle when it is positioned at the brewing station. As such, the housing of the shuttle includes one or more openings defined through a surface thereof, such that heated air can be introduced into the housing and into a space defined between the internal beverage holding tank and the housing.

In some embodiments, the housing includes: a main body member, which substantially forms the sides of the housing; a bottom member, which substantially forms the bottom surface of the housing; and an insulating insert contained substantially within the main body member. The insulating insert includes a bottom wall and a circumferential side wall, which define a generally cylindrical internal cavity. The internal beverage holding tank has a generally cylindrical shape with a bottom wall and a circumferential side wall. However, the internal beverage holding tank is sized such that, when the internal beverage holding tank is positioned in and contained within the housing, the bottom wall of the internal beverage holding tank is at a spaced distance from the bottom wall of the insulating insert. Similarly, the exterior surface of the side wall of the internal beverage holding tank is at a spaced distance from the inner surface of the side wall of the insulating insert. Such separation between the respective bottom walls and side walls creates the space between the internal beverage holding tank and the housing into which heated air can be introduced.

The brewing station includes one or more ports that are configured to mate with and/or engage the one or more openings that are defined through the surface of the housing of the shuttle when the shuttle is positioned at the brewing station. The brewing station includes a heater and a fan that provide the heated air to the shuttle. The heated air travels out of a port of the brewing station and into an opening of the shuttle, and then into the space defined between the internal beverage holding tank and the housing of the shuttle.

In some embodiments, the shuttle includes first and second openings, and the brewing station includes first and second ports that are configured to mate with and/or engage the first and second openings. A duct connects the first port to the second port at the brewing station, and the heater and the fan are positioned in the duct. As a result, there is a complete circuit. The heated air travels out of the first port of the brewing station and into the first opening of the shuttle, and then into the space defined between the internal beverage holding tank and the housing of the shuttle. The air exits through the second opening of the shuttle and passes through the second port of the brewing station, where it is returned to the duct.

DETAILED DESCRIPTION OF THE INVENTION

The present invention is a convective (or forced air) heating system for a portable beverage dispensing container of a satellite brewing system. When the portable beverage dispensing container is positioned at the brewing station to receive a brewed beverage, heated air is directed into a space defined between an internal beverage holding tank and a housing of the portable beverage dispensing container.

Figure 1:
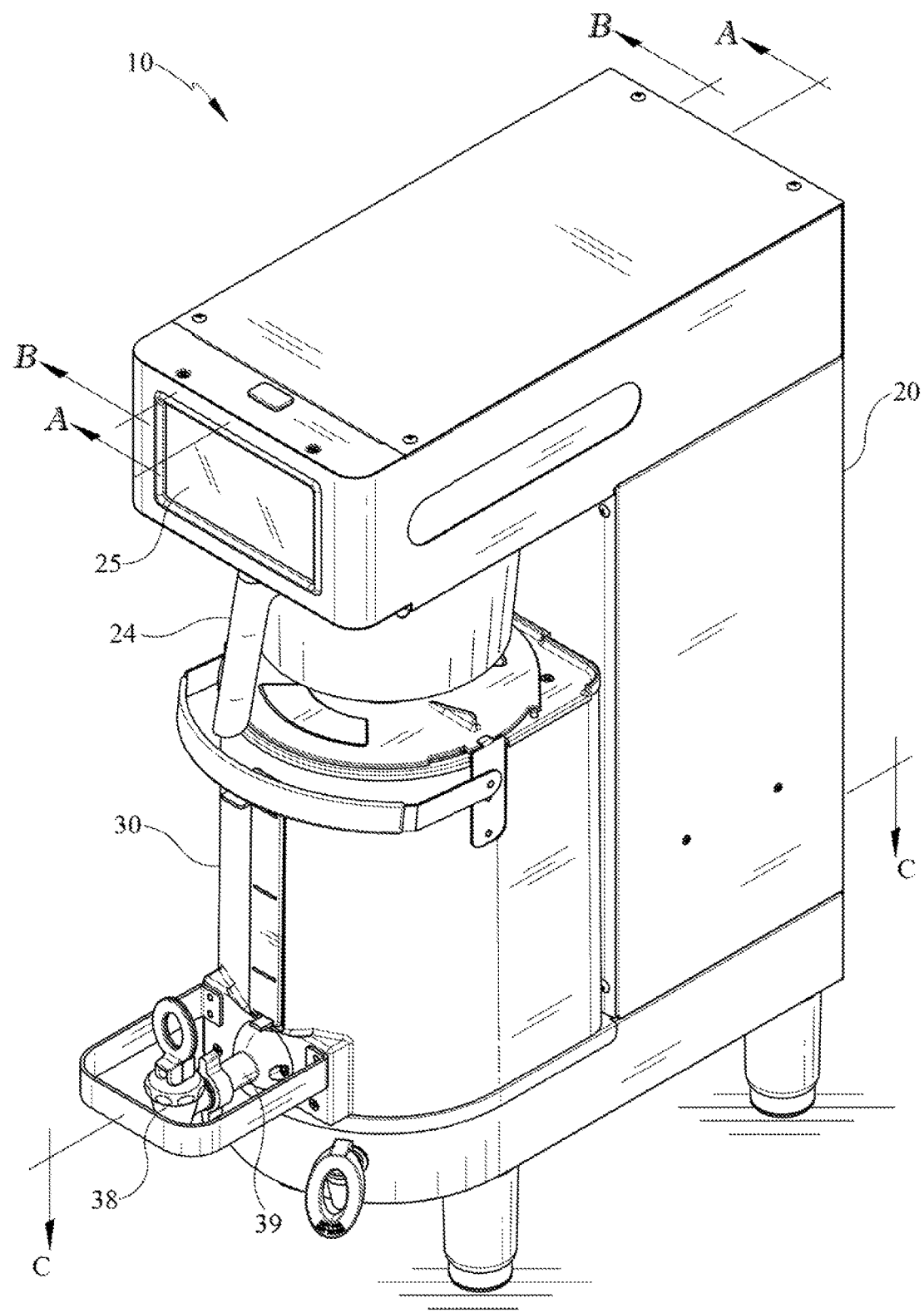
FIG. 1 is a perspective view of an exemplary satellite brewing system, including a portable beverage dispensing container made in accordance with the present invention.
Figure 2:
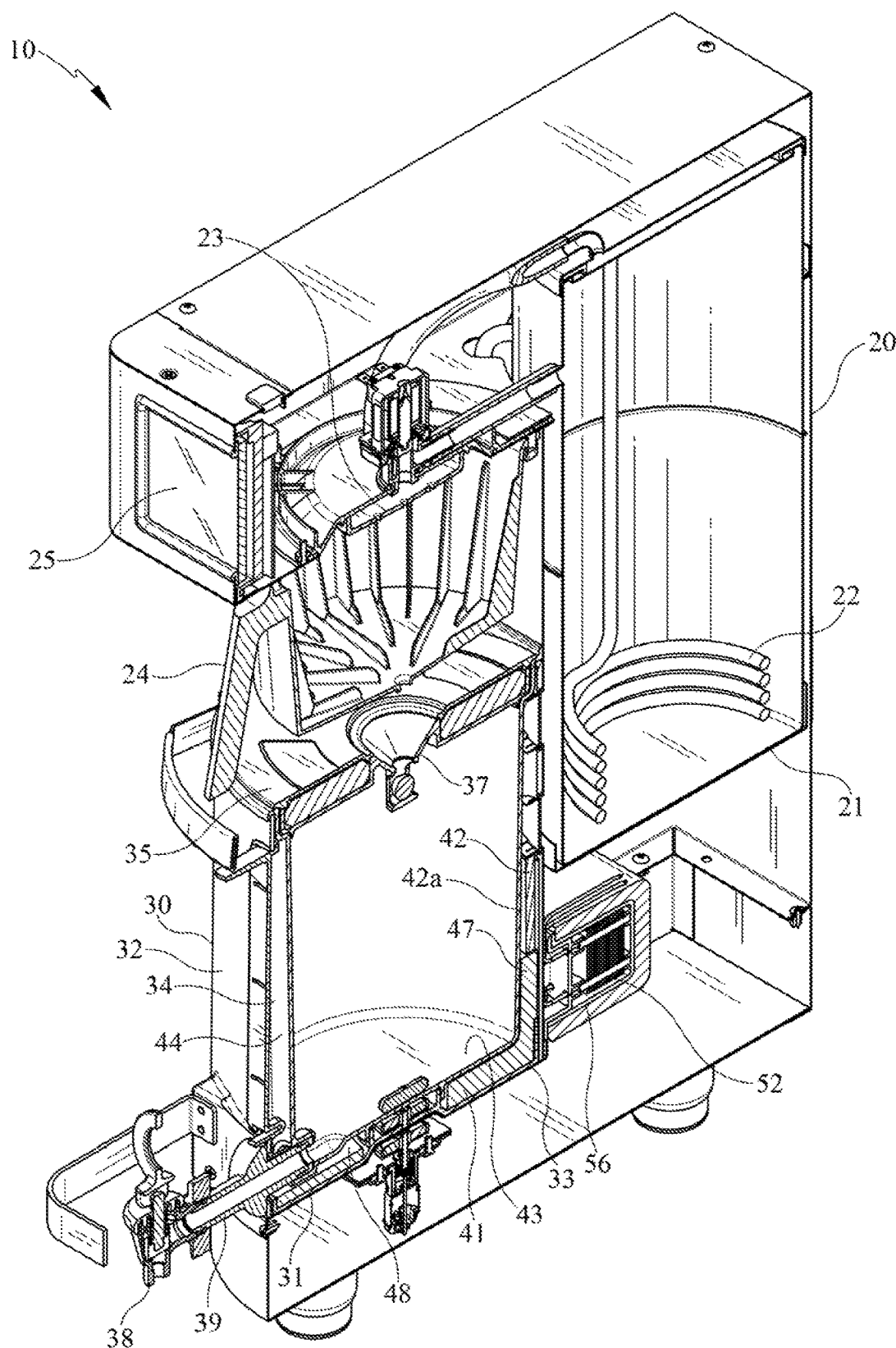
FIG. 2 is a sectional view of the exemplary satellite brewing system of FIG. 1, taken along line A-A of FIG. 1.
Figure 3:
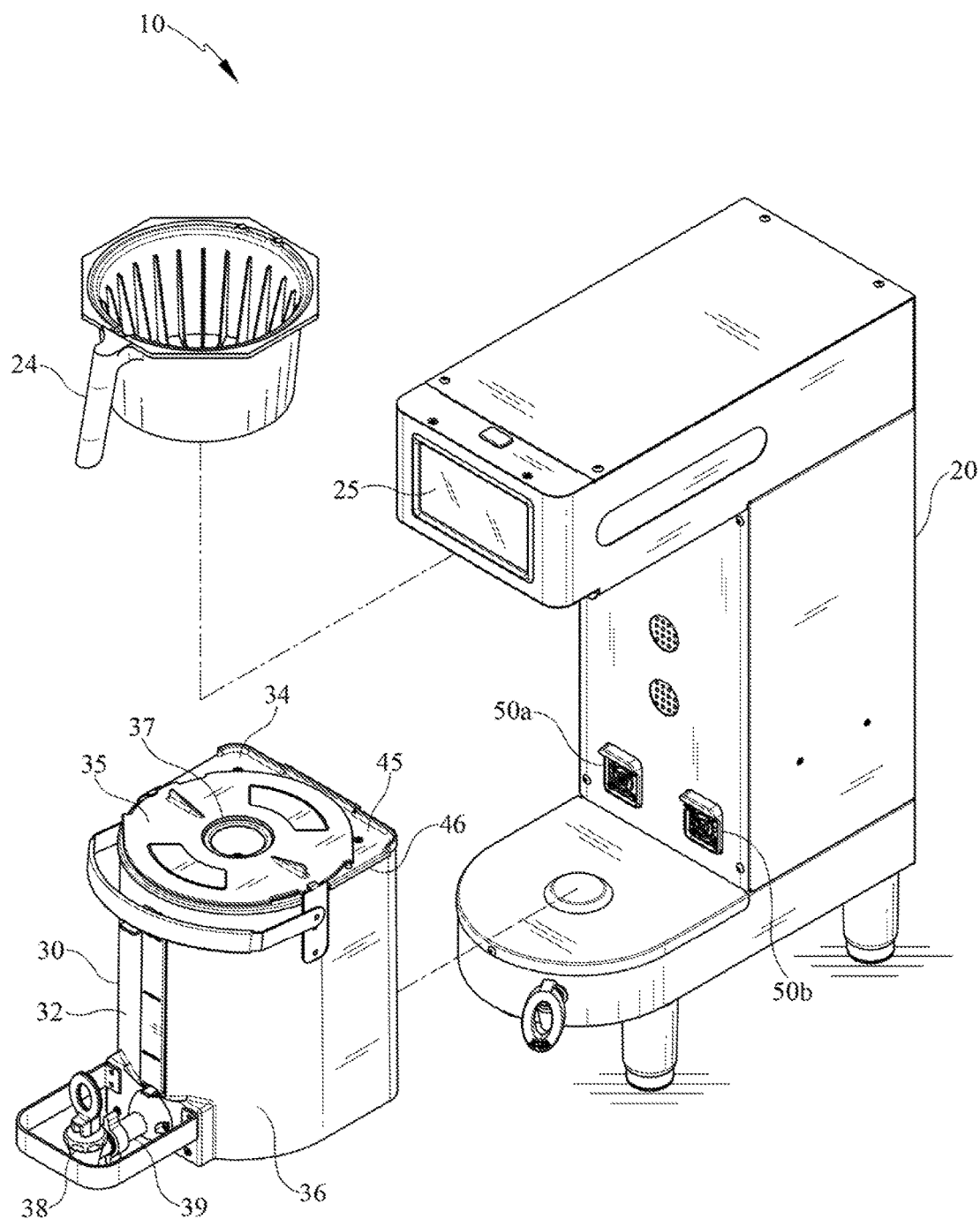
FIG. 3 is an exploded perspective view of the exemplary satellite brewing system of FIG. 1, showing the portable beverage dispensing container and brew basket separated from the brewing station.

As shown in FIGS. 1, 2, and 3, an exemplary satellite brewing system 10 made in accordance with the present invention generally comprises a brewing station 20 and a portable beverage dispensing container (or shuttle) 30. The shuttle 30 is selectively positioned under a brew basket 24 of the brewing station 20. As shown in FIG. 2, the brewing station 20 includes a water tank 21 (or reservoir) with a heater 22 configured to heat and maintain the water at a predetermined temperature. In use, a plumbing system of the brewing station 20 delivers the hot water from the water tank 21 to a spray head 23. The spray head 23 then delivers the hot water to the brew basket 24, introducing the hot water into the brew basket 24, such that the hot water contacts and passes through a quantity of ground coffee, tea, or other beverage component to produce a brewed beverage, which moves downward under the force of gravity and through a filter, pod, or other media (not shown) before being dispensed into the shuttle 30.

Figure 4:
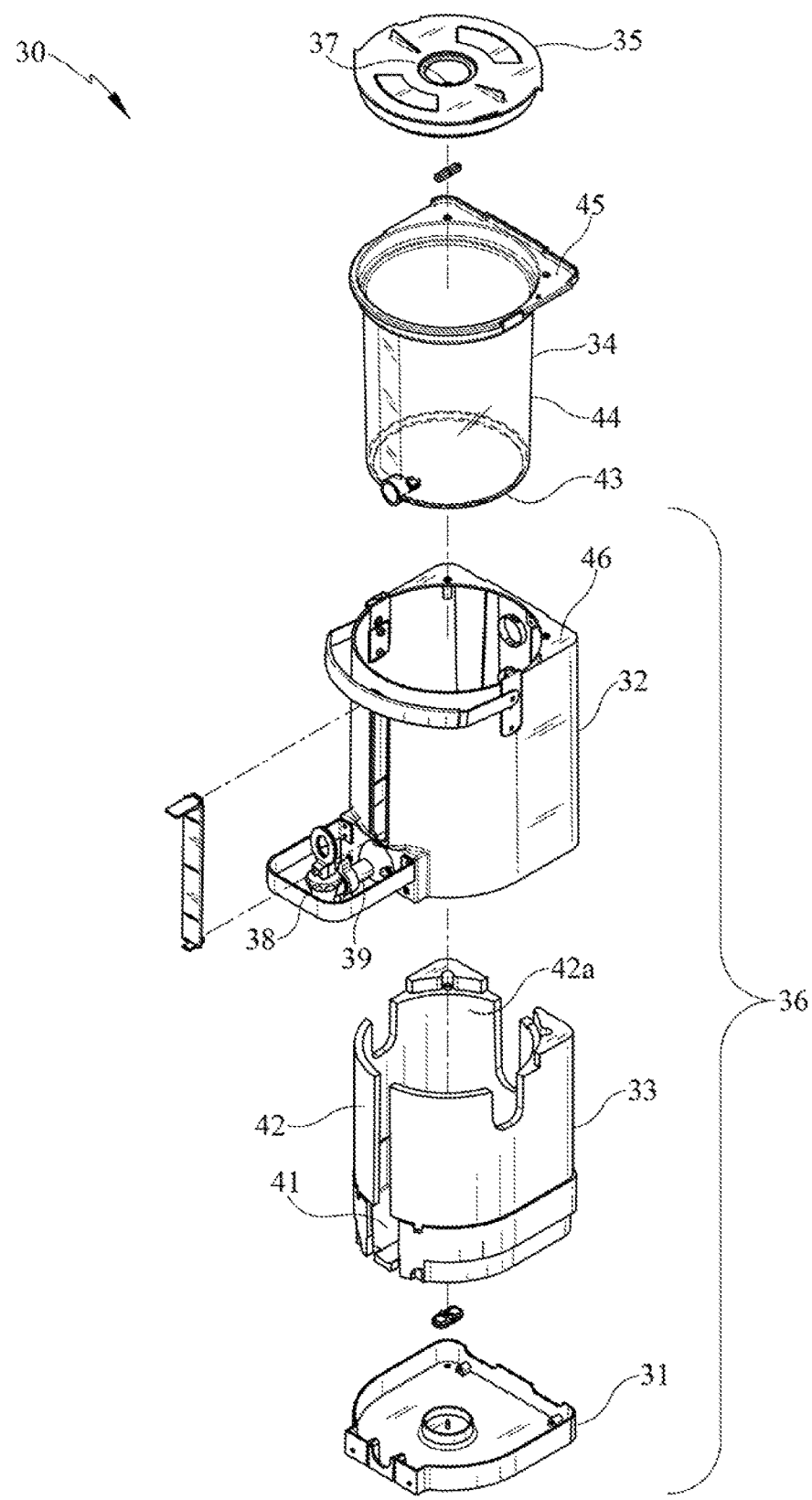
FIG. 4 is an exploded perspective view of the portable beverage dispensing container of the exemplary satellite brewing system of FIG. 1.

Referring still to FIGS. 1, 2, and 3, along with FIG. 4, the shuttle 30 includes a housing 36 with an internal beverage holding tank 34 (or liner) positioned in and contained within the housing 36. In this exemplary embodiment, and as perhaps best shown in FIG. 4, the housing 36 includes: a main body member 32, which substantially forms the sides of the housing 36; a bottom member 31, which substantially forms the bottom surface of the housing 36; and an insulating insert 33 contained substantially within the main body member 32. The bottom member 31 is removably secured to the main body member 32, so that the insulating insert 33 can be positioned and secured within the housing 36 around the internal beverage holding tank 34, as further discussed below.

Regardless of the particular construction of the housing 36, as mentioned above, the internal beverage holding tank 34 is positioned in and contained within the housing 36. In this exemplary embodiment, an upper flange 45 of the internal beverage holding tank 34 engages an upper surface 46 of the main body member 32 of the housing 36, thus maintaining the position of the internal beverage holding tank 34 relative to the housing 36. A lid 35 is selectively positioned over the top of the internal beverage holding tank 34, with an opening 37 defined in the lid 35, through which the brewed beverage is directed from the brew basket 24 into the internal beverage holding tank 34. Brewed beverage stored in the internal beverage holding tank 34 can then be dispensed through a dispensing nozzle 38 on the external surface of the housing 36, which is in fluid communication with the internal beverage holding tank 34 via a delivery tube 39.

Figure 5:
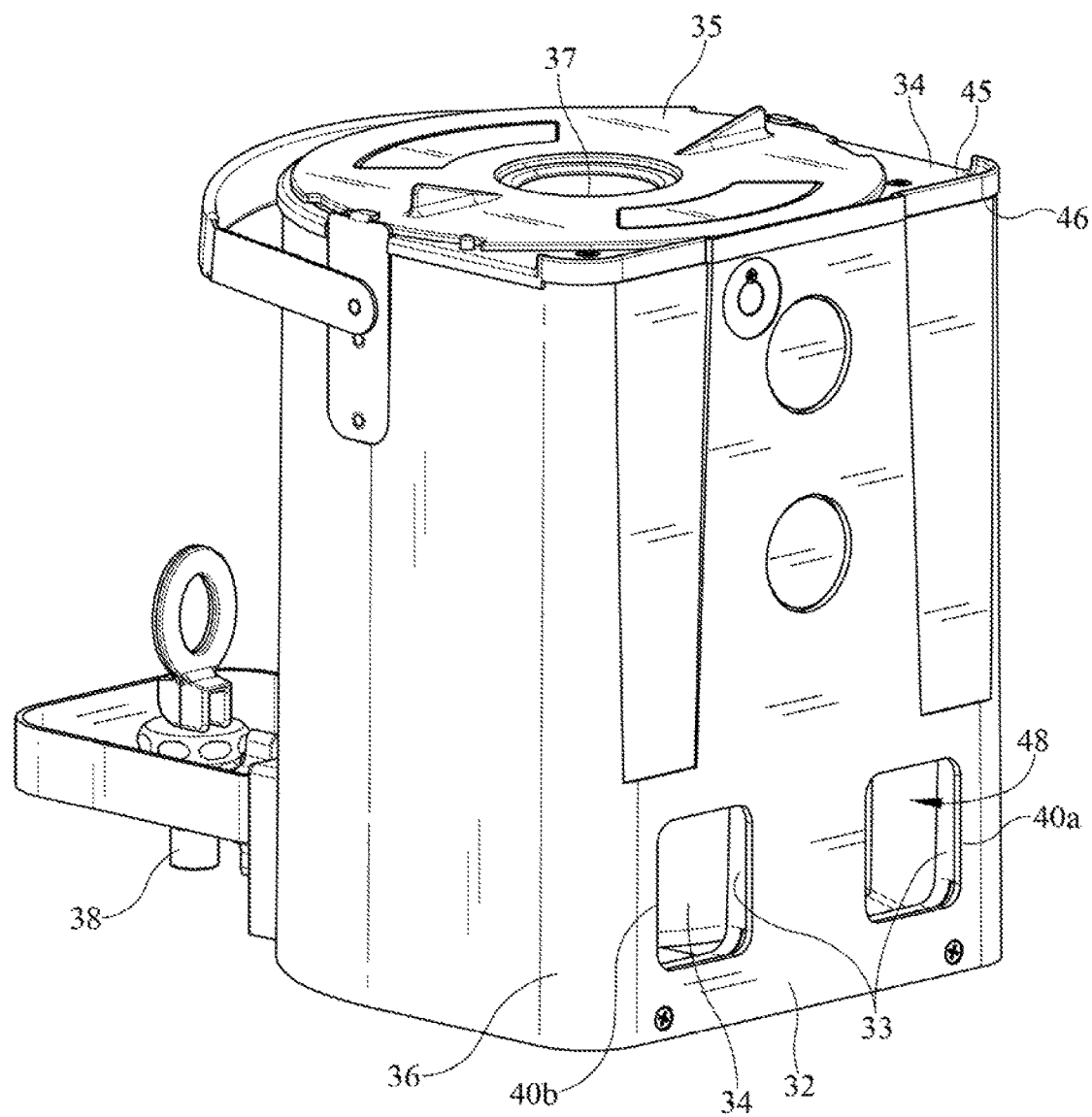
FIG. 5 is a rear perspective view of the portable beverage dispensing container of the exemplary satellite brewing system of FIG. 1.

Referring now to FIGS. 2, 5, 6, and 7, in this exemplary embodiment, there is a convective (or forced air) heating system that supplies heated air to the shuttle 30 when it is positioned at the brewing station 20. As best shown in FIG. 5, the shuttle 30 includes first and second openings 40a, 40b that are defined through both the main body member 32 and the insulating insert 33 at a rear surface of the housing 36. The first and second openings 40a, 40b define a pathway for heated air to enter and circulate through and around a space 48 within the housing 36 and adjacent to the internal beverage holding tank 34. In this exemplary embodiment, and as discussed below, the space 48 is defined, in part, by the insulating insert 33.

Figure 6:
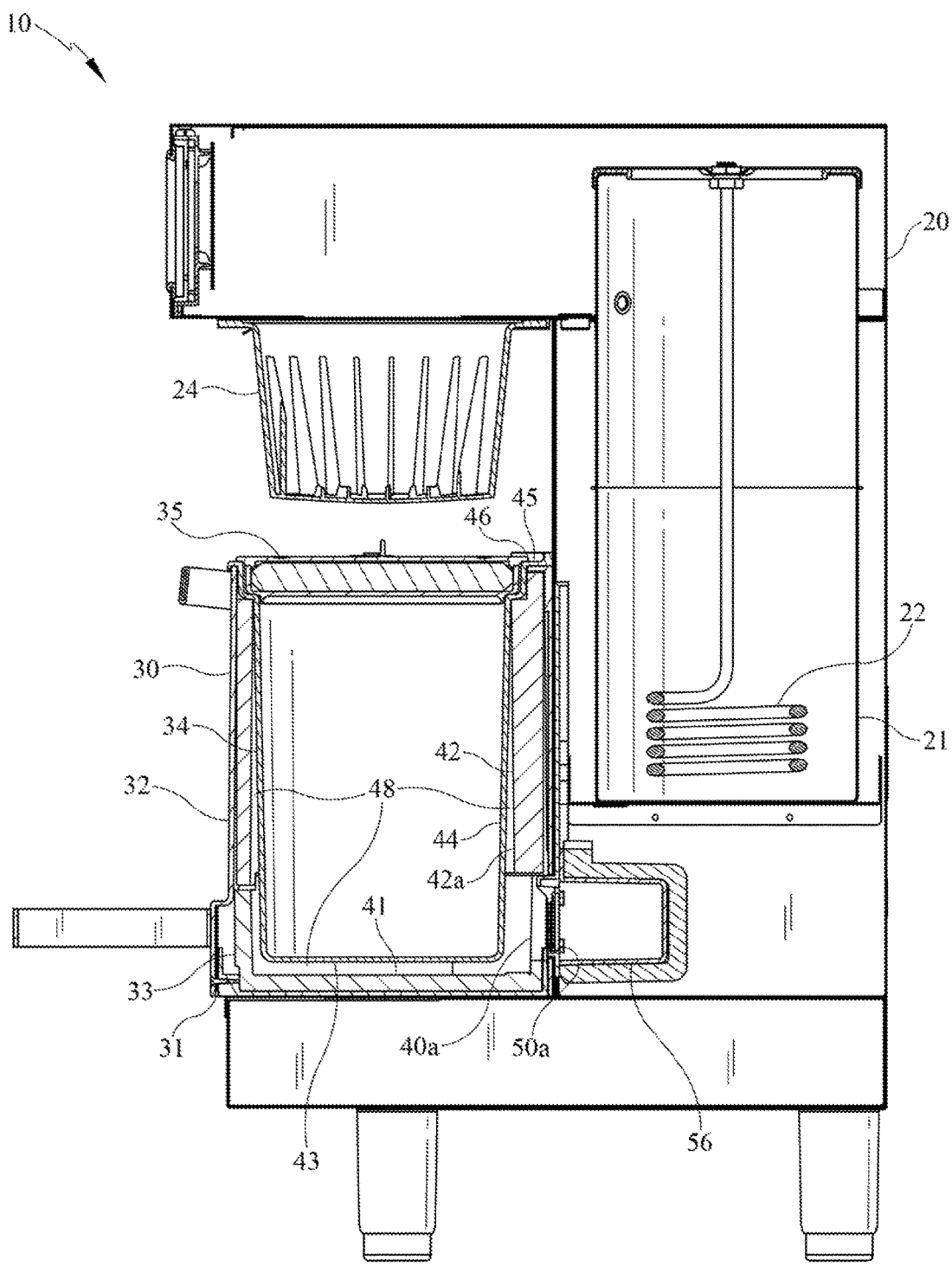
FIG. 6 is a sectional view of the exemplary satellite brewing system of FIG. 1, taken along line B-B of FIG. 1.

Referring now to FIGS. 2, 4, and 6, in this exemplary embodiment, the insulating insert 33 includes a bottom wall 41 and a circumferential side wall 42, which define a generally cylindrical internal cavity 42a. The internal beverage holding tank 34 has a generally cylindrical shape with a bottom wall 43 and a circumferential side wall 44. However, the internal beverage holding tank 34 is sized such that, when the internal beverage holding tank 34 is positioned in and contained within the housing 36, the bottom wall 43 of the internal beverage holding tank 34 is at a spaced distance from the bottom wall 41 of the insulating insert 33. Similarly, the exterior surface of the side wall 44 of the internal beverage holding tank 34 is at a spaced distance from the inner surface of the side wall 42 of the insulating insert 33. Such separation between the respective bottom walls 41, 43 and side walls 42, 44 creates the space 48.

Figure 7:
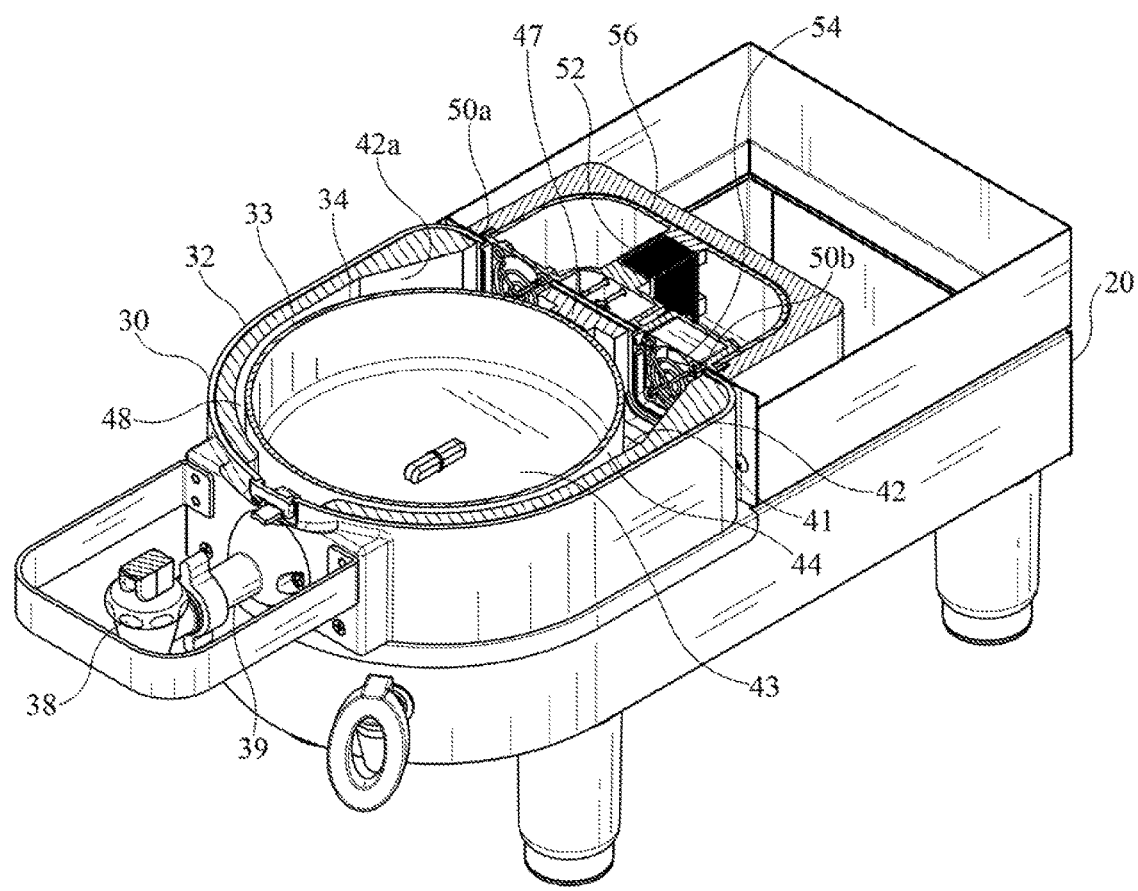
FIG. 7 is a sectional view of the exemplary satellite brewing system of FIG. 1, taken along line C-C of FIG. 1.

Furthermore, as best shown in the cross-sectional views of FIGS. 2, 6, and 7, in this exemplary embodiment, the distance between the insulating insert 33 and the internal beverage holding tank 34 is not uniform. Specifically, in this exemplary embodiment, the circumferential side wall 44 of the internal beverage holding tank 34 has a slight taper, with its diameter increasing from the bottom to the top. Thus, the distance from the exterior surface of the side wall 44 of the internal beverage holding tank 34 to the inner surface of the side wall 42 of the insulating insert 33 decreases from the bottom to the top. Thus, there is a greater volume in which the heated air can circulate near the bottom of the internal beverage holding tank 34.

Referring now to FIGS. 3, 6, and 7, the brewing station 20 includes first and second ports 50a, 50b that are configured to mate with and/or engage the first and second openings 40a, 40b that are defined through both the main body member 32 and the insulating insert 33 at the rear surface of the housing 36 of the shuttle 30 when the shuttle 30 is positioned at the brewing station 20. The brewing station 20 includes a heater 52 and a fan 54 that provide the heated air to the shuttle 30. The heated air travels out of the first port 50a of the brewing station 20 and into the first opening 40a of the shuttle 30, and then into the space 48 within the housing 36 that is defined, in part, by the insulating insert 33, and adjacent to the internal beverage holding tank 34.

Referring now to FIGS. 2 and 7, in this exemplary embodiment, the insulating insert 33 includes a portion 47 that extends from the exterior surface of the side wall 42 of the insulating insert 33 and between the first and second openings 40a, 40b of the shuttle 30, so that the heated air entering the first opening 40a is directed around (counterclockwise) the internal beverage holding tank 34 before exiting through the second opening 40b of the shuttle 30. Furthermore, as also shown in FIG. 7, a duct 56 connects the first port 50a to the second port 50b at the brewing station 20, and the heater 52 and the fan 54 are positioned in the duct 56. As a result, there is a complete circuit, as the air exits through the second opening 40b of the shuttle 30 and passes through the second port 50b of the brewing station 20, where it is drawn through the fan 54 and returned to the duct 56.

Advantageously, such hot air circulation provided by the satellite brewing system 10 of the present invention results in a more gentle application of heat to the brewed beverage contained within the internal beverage holding tank 34, as compared, for example, to using a heating element in direct contact with the shuttle 30 or the brewed beverage itself.

As a further refinement, it is contemplated that, in some embodiments, the brewing station 20 includes a proximity switch (for example, a reed switch) which detects whether the shuttle 30 is positioned at the brewing station 20. When the shuttle 30 is positioned at the brewing station 20, the proximity switch closes, activating the heater 52 and the fan 54, thus circulating heated air into and around the internal beverage holding tank 34 of the shuttle 30. Likewise, when the shuttle 30 is not so positioned at the brewing station 20, the proximity switch is open, and the heater 52 and fan 54 will not operate.

As a further refinement, it is contemplated that, in some embodiments, a thermistor or other temperature measuring device can also be positioned in the duct 56 to provide additional feedback and control for turning on and off the heater 52 and/or fan 54 based on the temperature of the circulating air. Similarly, readings of the temperature of the brewed beverage itself may also provide temperature feedback and control to the heater 52 and/or fan 54. Preferably, such temperature feedback means do not require direct contact with the shuttle 30 or the brewed beverage contained within. For example, an infrared sensor may be used to sense the temperature of the brewed beverage contained within the internal beverage holding tank 34 of the shuttle 30. Accordingly, there would be no electronics, controls, motors, or the like located on or within the shuttle 30 itself, and thus, the shuttle 30 could be completely submerged for cleaning without risk of damaging any electronics, controls, or motors.

Finally, as shown in FIGS. 1, 2, and 3, the exemplary satellite brewing system 10 includes a display 25 located on a front surface of the brewing station 20 in order to provide information regarding the operation of the satellite brewing system 10 to a user and/or as an input means for the user to input instructions and control operation of the satellite brewing system 10.

One of ordinary skill in the art will recognize that additional embodiments are possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A satellite brewing system, comprising:
   a brewing station for producing a beverage; and
   a shuttle that is selectively positioned at the brewing station to receive the beverage, said shuttle including a housing, along with an internal beverage holding tank positioned in and contained within the housing which is configured to receive and store the beverage;
   wherein the housing includes a first opening and a second opening defined through a surface thereof, with the first opening and the second opening connected via a space defined between the internal beverage holding tank and the housing; and
   wherein the brewing station includes a heater and a fan for generating heated air, along with a first port configured to engage the first opening and a second port configured to engage the second opening when the shuttle is positioned at the brewing station, such that the heated air can enter the first opening of the housing via the first port, circulate through the space defined between the internal beverage holding tank and the housing, and then exit the second opening of the housing into the second port.

2. The satellite brewing system as recited in claim 1, wherein a duct connects the first port and the second port.

3. The satellite brewing system as recited in claim 2, wherein the heater and the fan are positioned in the duct.

4. The satellite brewing system as recited in claim 1, wherein the housing includes a main body member, a bottom member, and an insulating insert contained substantially within the main body member.

5. The satellite brewing system as recited in claim 4, wherein the first opening and the second opening are defined through both the main body member and the insulating insert.

6. The satellite brewing system as recited in claim 4, wherein the insulating insert includes a bottom wall and a side wall, which define a generally cylindrical internal cavity, wherein the internal beverage holding tank has a generally cylindrical shape with a bottom wall and a side wall, and wherein the internal beverage holding tank is positioned in the generally cylindrical internal cavity defined by the insulating insert.

7. The satellite brewing system as recited in claim 6, wherein the bottom wall of the internal beverage holding tank is at a spaced distance from the bottom wall of the insulating insert, and wherein an exterior surface of the side wall of the internal beverage holding tank is at a spaced distance from an inner surface of the side wall of the insulating insert, thus creating the space between the internal beverage holding tank and the housing.

8. A satellite brewing system, comprising:
   a brewing station for producing a beverage; and
   a shuttle that is selectively positioned at the brewing station to receive the beverage, said shuttle including a housing, along with an internal beverage holding tank positioned in and contained within the housing which is configured to receive and store the beverage;
   wherein the housing of the shuttle includes a first opening and a second opening defined through a surface thereof, with the first opening and the second opening connected via a space defined between the internal beverage holding tank and the housing;
   wherein the brewing station includes a first port and a second port connected by a duct, with the first port configured to engage the first opening of the housing of the shuttle and the second port configured to engage the second opening of the housing of the shuttle when the shuttle is positioned at the brewing station; and wherein a heater and a fan are positioned within the duct between the first port and the second port to generate heated air, which, when the shuttle is positioned at the brewing station, exits the first port and enters the first opening of the housing, circulates through the space defined between the internal beverage holding tank and the housing, and then exits the second opening of the housing into the second port.

9. The satellite brewing system as recited in claim 8, wherein the housing includes a main body member, a bottom member, and an insulating insert contained substantially within the main body member.

10. The satellite brewing system as recited in claim 9, wherein the first opening and the second opening are defined through both the main body member and the insulating insert.

11. The satellite brewing system as recited in claim 9, wherein the insulating insert includes a bottom wall and a side wall, which define a generally cylindrical internal cavity, wherein the internal beverage holding tank has a generally cylindrical shape with a bottom wall and a side wall, and wherein the internal beverage holding tank is positioned in the generally cylindrical internal cavity defined by the insulating insert.

12. The satellite brewing system as recited in claim 11, wherein the bottom wall of the internal beverage holding tank is at a spaced distance from the bottom wall of the insulating insert, and wherein an exterior surface of the side wall of the internal beverage holding tank is at a spaced distance from an inner surface of the side wall of the insulating insert, thus creating the space between the internal beverage holding tank and the housing.

\* \* \* \* \*